May 6, 1969 D. E. DOHLER 3,443,027

CONTROL SYSTEM FOR FLYING SPOT SCANNERS

Filed Nov. 26, 1965 Sheet 1 of 2

INVENTOR
DAVID E. DOHLER

BY Paul M. Brannen
AGENT

United States Patent Office 3,443,027
Patented May 6, 1969

3,443,027
CONTROL SYSTEM FOR FLYING SPOT SCANNERS

David E. Dohler, Endicott, N.Y., assignor to International Business Machines Corporation, Armonk, N.Y., a corporation of New York Filed Nov. 26, 1965, Ser. No. 509,939
Int. Cl. H04n 5/38
U.S. Cl. 178—7.2 5 Claims

ABSTRACT OF THE DISCLOSURE

A flying spot scanner for scanning a document having a background area adjacent the document and including means for detecting when the scanning beam leaves the document and enters the background area and reversing the direction of the scanning beam.

This invention relates to control systems for flying spot scanners, and particularly to a document edge detector for flying spot scanners. More particularly, the invention relates to an improved arrangement which detects the motion of the beam of a flying spot scanner from the document which it is scanning onto the background, and thereupon reverses the direction of motion of the scanning beam to cause it to traverse the document again in the opposite direction.

Flying spot scanners are well known in the art of facsimile transmission and character recognition, and as usually constituted, comprise a suitable cathode ray tube with an optical system arranged so that some type of scanning raster or sweep is moved across a document in such fashion that characters or patterns on the document are successively illuminated and the reflected video pulses caused by portions of characters are detected by means of a suitable photo detection device, amplified and thereafter (in the case of character recognition) analyzed by some system which determines the value of the character which has been scanned.

When such an arrangement is used for scanning documents, the scanning beam must traverse the document from one side to the other in order to examine all areas in which characters may be found. If the documents are of one fixed size, suitable guide means may be arranged so that as the documents pass the scanning location, their edges are exactly fixed with respect to the cathode ray tube and the optical system so that a traverse of a cathode ray tube scanning beam may be made to travel within a specific region which is fixed by the design parameters. In such an instance it is, of course, unnecessary to detect the edge of the document because the cathode ray tube beam is automatically held to limits which are commensurate with the size of the document scanned.

However, when the documents to be scanned are of varying widths, some means must be provided for detecting the edge of the document and reversing the direction of travel of the scanning beam when the edge has been reached.

Accordingly, it is the principle object of the present invention to provide an arrangement for automatically reversing the direction of travel of a cathode ray tube scanning beam when such a beam reaches the edge of a document.

Another object of the invention is to provide an arrangement of the type described in which the direction of travel of the scanning beam is automatically reversed by taking into account the difference in reflectivity of the document surface and the background area against which the document is travelling in order to cause reversal of beam travel.

Still another object of the invention is to provide an improved arrangement of the type described which is relatively simple from a circuit standpoint and enables the prompt reversal of the beam after it has left the edge of documents which may be of any range of predetermined widths.

Briefly described, the present invention contemplates use of the cathode ray tube scanning arrangement in which the document is positioned against a black background larger than the maximum size of the document and sufficiently large to allow for suitable positioning of the document in such manner that as the cathode ray tube beam moves back and forth in the scanning area which is potentially large enough to cover all of the background, it will pass at each direction of its traverse across the document from the document to the background area itself.

When the cathode ray tube spot sweeps beyond the document, the video output from the photo sensitive device will indicate that black is being scanned just as when scanning information is being derived from characters on the document. This information is transformed into suitable digital signals, one value of which indicates black and the other indicates white. The fact that the beam is scanning the background rather than document information is determined by timing the length of black signals, and when the circuitry "sees" black for longer than a predetermined interval, it is evident that the beam has left the edge of the document and is moving on the background. At this time, logic circuits reverse the direction of the beam travel, whereupon the beam traverses the document in the other direction until similar action takes place when the beam moves off the document at the other side thereof.

The foregoing and other objects, features and advantages of the invention will be apparent from the following more particular description of a preferred embodiment of the invention, as illustrated in the accompanying drawings.

In the drawings.

In the drawings, similar reference characters refer to similar parts in each of the several figures.

Figure 1:
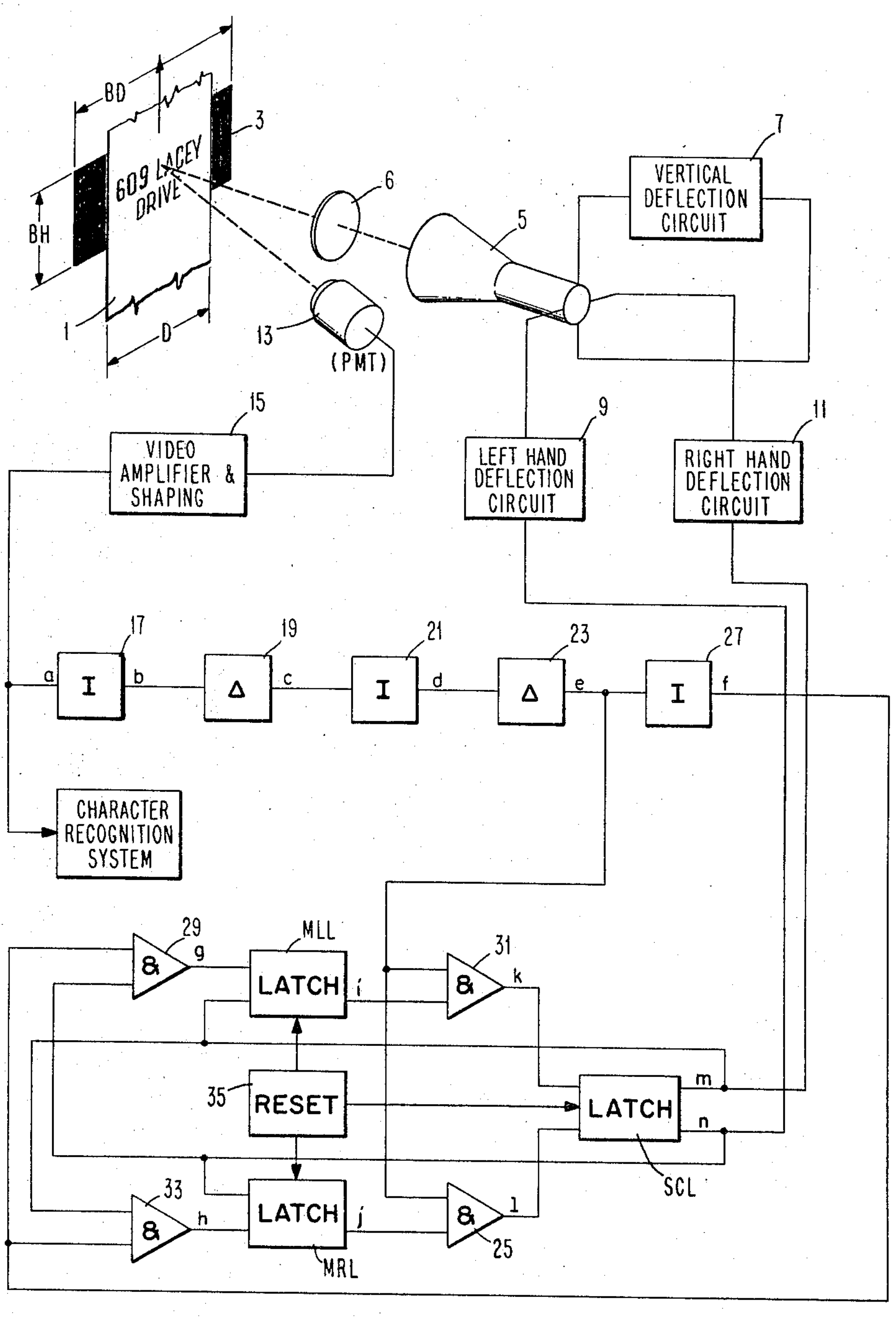
FIG. 1 shows in block diagram form one form of cathode ray tube flying spot scanner apparatus embodying the present invention.

Referring now to FIG. 1 of the drawings, there is shown in diagrammatic form one arrangement of a cathode ray tube scanner embodying the present invention. As illustrated, a document of width D is moved in the direction shown by the arrow, namely from bottom to top across a platen or background member 3 which is black or of a heavy contrast to the color of the document itself. This background, or platen, has dimensions BD wide by BH high, these dimensions constituting the maximum area through which the cathode ray tube scanning beam can move. Dimension BD will generally be arrived at by including the width D of the widest document to be scanned plus a suitable extra amount to allow for the positioning of the document on the background plus the time required for the reversal of the beam when traversing the background. The height BH of the background will be determined by the potentially largest excursions of the scanning beam in a vertical direction with respect to the document motion and the like.

Suffice it to say that the arrangement shown provides a contrasting background at each side of the document to be scanned irrespective of the width of the document or the position of the document on the background plate. Scanning is performed by a conventional cathode ray tube scanner apparatus including a cathode ray tube 5 and optical system shown diagrammatically by the single lens 6 arranged so that the scanning pattern formed by the beam on the face of the cathode ray tube 5 is suitably projected onto the document 1.

The motion of the beam of the flying spot scanner is generated in the usual manner by suitable deflection circuits, such as the vertical deflection circuit 7, the left-hand deflection circuit 9 and right-hand deflection circuit 11. The details of these circuits are not shown, since they can take any one of numerous forms well known in the art. It is deemed sufficient to point out that the potentials or currents generated thereby are applied to the deflection means in the cathode ray tube 5 to produce appropriate beam motion as will be later described. In the present invention, the actual form of the scanning raster which is used to scan the characters to determine the information therefrom is not germane to the invention and hence will not be described. It is only important to note that under the control of the horizontal deflection circuits 9 and 11, the scanning action of the cathode ray tube beam takes place in a direction from one side of the document to the other such as from left to right at a relatively slow rate while scanning the characters followed by a quick return to the left-hand side to begin the scanning of a new line, the document 1 having been moved in the meantime to a position where a new line of characters is to be scanned. All of this is in accordance with known arrangements and need not be described further in detail.

The changes in light intensity caused by the scanning operation of the cathode ray tube beam projected onto the document 1 or background 3 cause variations in the output of a photomultiplier tube or other photosensitive device 13, which signals are suitably amplified and shaped in the video amplifying and shaping circuits 15, to provide at the output thereof pulses which are binary valued and have a first level, such as a minus or zero level, when the beam is moving in the document area only, and which have a second value such as a 1 or positive value when the beam is traversing a portion of a character or a portion of the background 3. These video signals, after being quantized in the manner described, are supplied to a character recognition system, as indicated on the diagram. The exact format of the character recognition system is not pertinent to the present invention and hence it is not further illustrated herein but it may take any one of a number of well known forms. The remainder of the circuitry to be described will be the detailed logic circuitry constituting one embodiment of the present invention which provides the automatic traversal of the scanning beam after it has left the document at either side.

Figure 2:
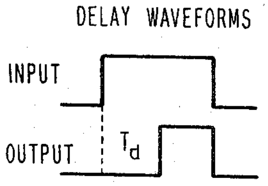
FIG. 2 shows the waveforms obtained by use of delay devices such as illustrated in FIG. 1.

The signals from the video amplifier and shaping circuits 15 are supplied through a first inverter 17 and a delay unit 19, followed by a second inverter 21 and a delay unit 23. These inverter and delay units, as well as the other electronic components shown in the logic diagram, are conventional in nature and the details thereof are not shown since they may take any one of a number of well known forms. These delay circuits are of a type which provide an output signal related to the input in the manner shown in FIG. 2 in the drawings. As shown therein, an input waveform does not immediately provide an output from the delay, but instead the positive going input only causes a positive going output at some time delay period "T*d*," as shown in the drawing. However, when the input waveform returns to its normal state, the output waveform is also simultaneously restored. In other words, the delay units delay only the positive going portion of the input waveform. Such arrangements are available by way of units employing diodes in the timing circuitry so that the delay timing is effective only for one polarity of the input signal.

Figure 3:
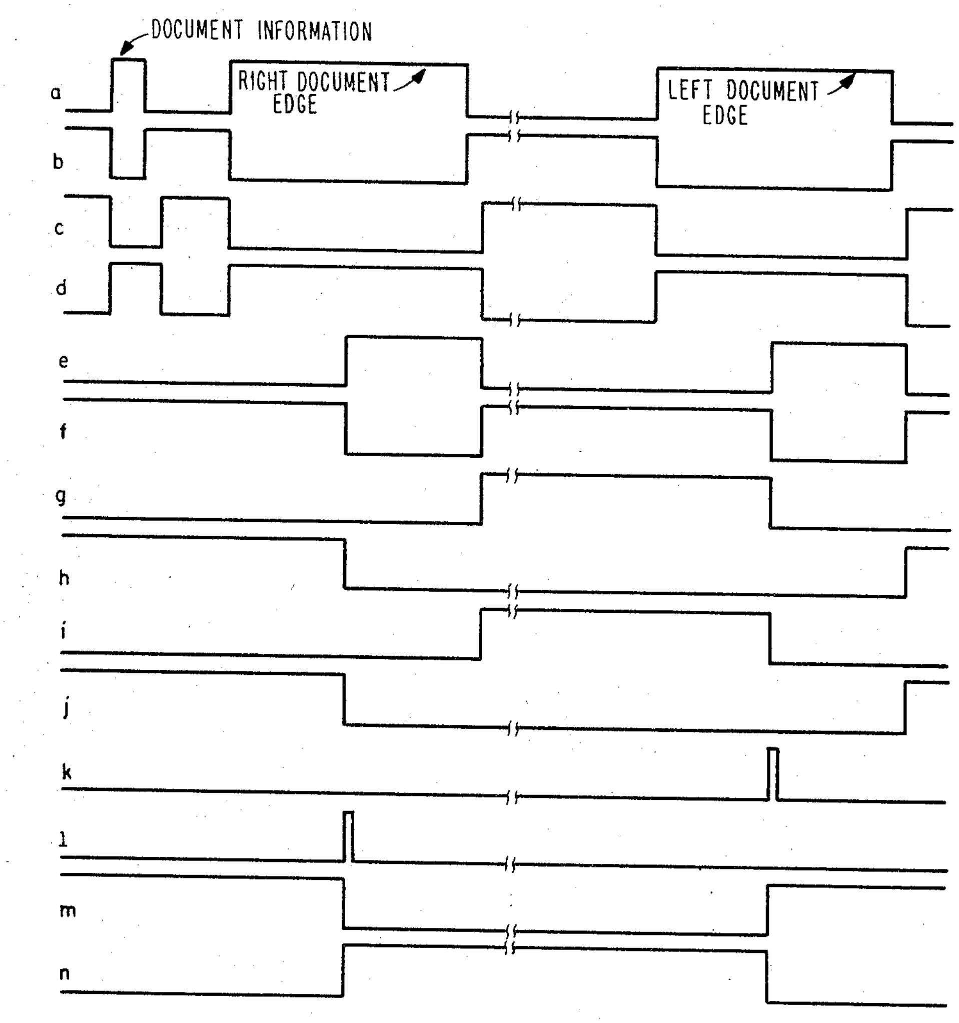
FIG. 3 shows the waveforms encountered at different points in the circuitry shown in FIG. 1.

The operation of the units 17 through 23 may be better understood by consideration thereof with respect to inputs under varying conditions as shown by the exemplary timing chart in FIG. 3. With the parts connected as shown, a positive going video signal indicative of black information will cause a point *a*, the input to inverter 17, to go positive. Therefore, the output at point *b* will go negative and this signal will go directly through the delay unit 19 to cause point *d* to go positive. If the black video signal is due to the scanning of information on the document, the video signal will end before the operating time of delay unit 23 and no other circuit action will take place. Such action is illustrated in the first portion of the timing charts, where a short pulse at point *a* designated "document information," produces a negative going pulse at point *b* which pulse by virtue of the delay produces a longer negative going signal *m* at point *c* which is in turn inverted at point *d*. Since this circuit action is all shorter than that for which the delay unit 23 is effective, no other action takes place and the output at point *e* of delay unit 23 remains quiescent.

If the black video signal is sufficiently long, as a result of a spot sweeping beyond the document and into the black background area 3 on either side, sufficient time will elapse so that the delay circuit 23 will provide an output at which time point *e* in the circuitry will go positive as illustrated on the timing chart of FIG. 3 for the condition "right document edge." By the circuitry to be described subsequently, the sweep controls will reverse the motion of the spot. When the spot sweeps back onto the document, point *a* will go negative since the spot has moved from the background area onto the lighter colored document so that point *b* goes positive. After the delay imposed by delay unit 19, point *c* will go positive causing points *d* and *e* to thereby go negative since there will be no delay in unit 23 for a negative going signal.

It has been shown above how the video signals derived from the scanning of the document are utilized to generate signals which indicated whether or not a portion of the document is being scanned by the scanning beam or if the dark signal provided is one which is the result of a beam leaving the document. There will now be described a second portion of the circuitry which governs the left- and right-hand deflection circuits in such manner as to appropriately reverse the direction of deflection when the beam leaves the edge of the document. The system as herein shown and described utilizes three latches or other bistable circuits of a conventional nature, which are constructed and arranged in such manner that when a signal is provided to an appropriate input terminal, the latch will turn to its on condition and remain in that condition until an appropriate input signal is supplied to another input of the latch at which time the latch will be turned off and remain so until the next on signal. Three such latches are provided, designated by the reference characters MLL, MRL, and SCL, indicating respectively "moving left latch," "moving right latch," and "sweep control latch." The inputs to these latches are derived from logic circuits including the appropriately measured video signals, as well as outputs from the latch SCL which also governs the deflection circuits 9 and 11. The operation of these controls may be described by illustrating the manner in which they operate under various conditions. For instance, if the scanning spot is moving from left to right as it moves off the document, the sweep control latch SCL and the moving right latch MRL will be on at this time. When the output *e* of delay 23 goes positive, and with latch MRL on, both of the inputs to the AND circuit 25 will be effective and the output therefrom designated by *l* will be supplied to the sweep control latch SCL to the terminal thereof which turns the latch off. Under this circumstance the output *m* of latch SCL will go down and the output *n* will come up so that the right-hand deflection circuit 11 will be disabled and the left-hand deflection circuit 9 will be enabled thus causing the character scanner spot to reverse direction and start moving to the left. The output from latch SCL at point *n* is also supplied to the input of latch MRL to turn this latch off.

When the moving spot passes onto the document surface again, the "black" video signal will abate, and after the predetermined time interval described above, the output *e* of delay 23 will go negative. When point *e* goes negative, the output *f* of inverter 27 will go positive and at this time both inputs to AND circuit 29 will be effective to provide an output at point *g*, which will turn the moving left latch MLL to its on condition.

With the moving left latch MLL turned on and the sweep control latch SCL in its off condition, when the spot sweeps beyond the left edge of the document and delay 23 provides a positive signal at point *e*, the AND circuit 31 will be enabled since both of its inputs are suitably energized and the output at point *k* will rise to thereby turn sweep control latch SCL on. With the sweep control latch SCL set on, the right-hand deflection circuit 11 is enabled and the left-hand deflection circuit 9 is disabled thus again reversing the spot motion so that the spot starts to sweep right. The output at point *m* of latch SCL is fed back to the off input of the moving left latch MLL thereby turning this latch off.

When point *e* goes negative as a result of the spot moving back onto the document, the output from inverter 27 together with the on output from point *m* of the sweep control latch SCL will be supplied to the inputs of the AND circuit 33 whereupon the output *h* of this device supplies a signal to turn the moving right latch MRL on.

As in most systems of this type, when the circuitry is initially energized, it is sometimes difficult to predict the state to which the bistable elements will be set. That is, the latches could initially take either an on or an off condition. For this reason, it is preferable to provide some type of resetting circuit designated generally by the reference character 35, which is effective to set the latches MLL, MRL, and SCL in one or the other of their conditions as may be determined by system requirements, so that when the system is initially energized, the three latches will be set in appropriate conditions to cause an initial spot movement in one of the two directions, as may be selected by design of the circuitry.

It will be apparent to those skilled in the art that the circuit arrangement is not limited to that shown herein and that the logic and deflection circuitry may be varied from that shown. It is deemed sufficient to point out that the present invention contemplates the use of an arrangement wherein the passage of the scanning spot from a document to a background area is detected by suitable means, which means governs the reversal of the spot direction so that the spot is swept back onto the document and across, whereupon the same procedure is followed when a spot leaves the document at the other edge, so that effectively the spot is maintained in continuous motion. It will be apparent, too, that since the reversal of the spot is governed by the spot leaving the document edge and entering the background, that it is immaterial as to the width of the document as long as it falls within the outermost range of the scanning area, or the position of the document on the background, since neither of these factors will affect the reversing operation.

While the invention has been particularly shown and described with reference to a preferred embodiment thereof, it will be understood by those skilled in the art that various changes in form and details may be made therein without departing from the spirit and scope of the invention.

What is claimed is:

1. A control system for a flying spot scanner, including a cathode ray tube comprising, in combination, (a) deflection means for selectively deflecting the beam of the cathode ray tube to cause the beam to traverse a document in either a first or a second direction and thereafter to traverse a background area adjacent said document, (b) detecting means for detecting the movement of said beam beyond the edge of the document and on said background area, and (c) control means connected to said deflection means and governed by said detecting means for reversing the direction of beam deflections when the beam leaves the edge of said document.

2. A control system for a flying spot scanner, as claimed in claim 1, in which the detecting means comprises means for distinguishing between character portions scanned by the scanner beam and background areas at each side of the document which areas contrast sharply in color with respect to the document itself.

3. A control system for a flying spot scanner, as claimed in claim 1, in which said control means includes at least one bistable device which determines the direction of beam travel in accordance with its two stable conditions.

4. A control system for a flying spot scanner, as claimed in claim 2, in which said detecting means includes means for distinguishing between short duration video signals resulting from scanning portions of a character, and long duration video signals resulting from scanning a contrasting background at the edges of the document.

5. A control system for a flying spot scanner, as claimed in claim 3, in which the control means comprises first latch means for indicating the scan motion in a first direction, second latch means for indicating the scan motion in a second direction, and third latch means governed by said first and second latch means for selectively controlling the movement of said scan in said first or said second direction.

References Cited

UNITED STATES PATENTS

| | | | |
|---|---|---|---|
| 2,957,941 | 10/1960 | Covely | 178—6.8 |
| 3,050,581 | 8/1962 | Bomba | 250—202 |
| 3,213,422 | 10/1965 | Fritze | 340—146.3 |
| 3,215,773 | 11/1965 | Chatten | 178—6.8 |

ROBERT L. GRIFFIN, *Primary Examiner.*

J. A. ORSINO, Jr., *Assistant Examiner.*

U.S. Cl. X.R.

250—202, 217; 340—146.3